(12) United States Patent
Yaeger et al.

(10) Patent No.: US 12,389,013 B2
(45) Date of Patent: Aug. 12, 2025

(54) MULTI-VIEW VIDEO CODEC

(71) Applicant: Apple Inc., Cupertino, CA (US)

(72) Inventors: Matthew J. Yaeger, Tustin, CA (US); David M. Cole, Aliso Viejo, CA (US); Benjamin D. Buckner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 313 days.

(21) Appl. No.: 17/932,531

(22) Filed: Sep. 15, 2022

(65) Prior Publication Data

US 2023/0077410 A1   Mar. 16, 2023

Related U.S. Application Data

(60) Provisional application No. 63/245,058, filed on Sep. 16, 2021.

(51) Int. Cl.
*H04N 19/167* (2014.01)
*H04N 13/161* (2018.01)
*H04N 19/16* (2014.01)

(52) U.S. Cl.
CPC ......... *H04N 19/167* (2014.11); *H04N 13/161* (2018.05); *H04N 19/16* (2014.11)

(58) Field of Classification Search
CPC ..... H04N 19/161; H04N 19/16; H04N 19/167
See application file for complete search history.

(56) References Cited

U.S. PATENT DOCUMENTS

| | | | |
|---|---|---|---|
| 10,652,558 B2 | 5/2020 | Abbas | |
| 2018/0350036 A1 | 12/2018 | Vanreenen | |
| 2020/0234501 A1 | 7/2020 | Rodriguez | |
| 2020/0288114 A1 | 9/2020 | Lakshman | |
| 2021/0266571 A1* | 8/2021 | Chen | H04N 19/132 |
| 2022/0044478 A1* | 2/2022 | Tashiro | H04N 5/2226 |

* cited by examiner

*Primary Examiner* — On S Mung
(74) *Attorney, Agent, or Firm* — Blank Rome LLP

(57) ABSTRACT

Encoding an image stream may include receiving an image stream with an original image resolution; generating a plurality of copies of the image stream with the original image resolution; encoding, for each copy of the plurality of copies of the image stream, the copy of the image stream to generate an encoded copy of the image stream, wherein the encoded copy of the image stream comprises a first region having a first image resolution and a second region having a second image resolution, wherein each encoded copy of the plurality of encoded copies of the image stream has a different first region, and providing, to a playback device, at least one encoded copy of the plurality of encoded copies of the image stream.

20 Claims, 12 Drawing Sheets

MULTI-VIEW VIDEO CODEC

BACKGROUND

This disclosure relates generally to image processing. More particularly, but not by way of limitation, this disclosure relates to techniques and systems of foveated imaging.

Some cameras are capable of capturing high-resolution image streams. Foveated imaging varies the image resolution across the image based on an area of interest within the image, which can simplify image rendering before display of the image stream. However, because the location of the area of interest within the image stream can change, multiple image streams with different foveations must be decoded in parallel, and may introduce edge errors as the system transitions from one image stream to another. What is needed is an improved technique to manage changing areas of interest in foveated imaging system.

DETAILED DESCRIPTION

Figure 1:
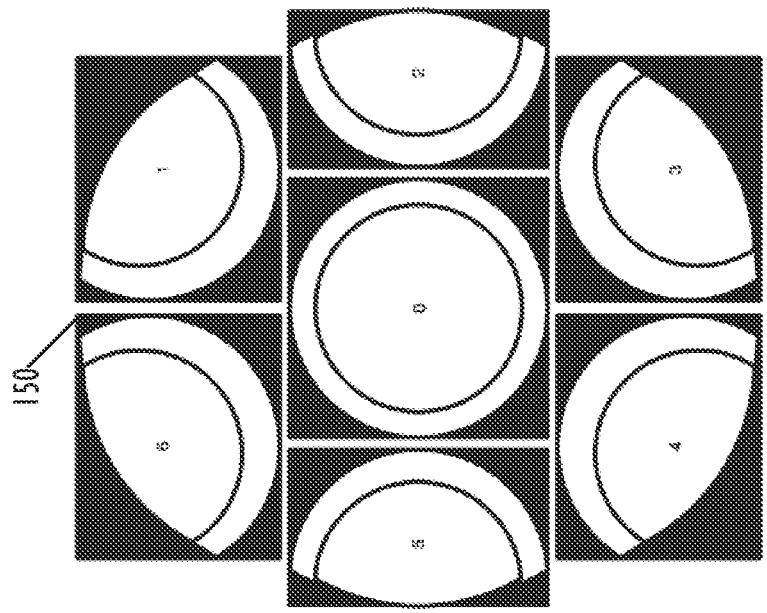
FIG. 1 shows an example diagram of multiple high-resolution regions within a foveated image stream captured by a fish-eye lens camera.
Figure 1:
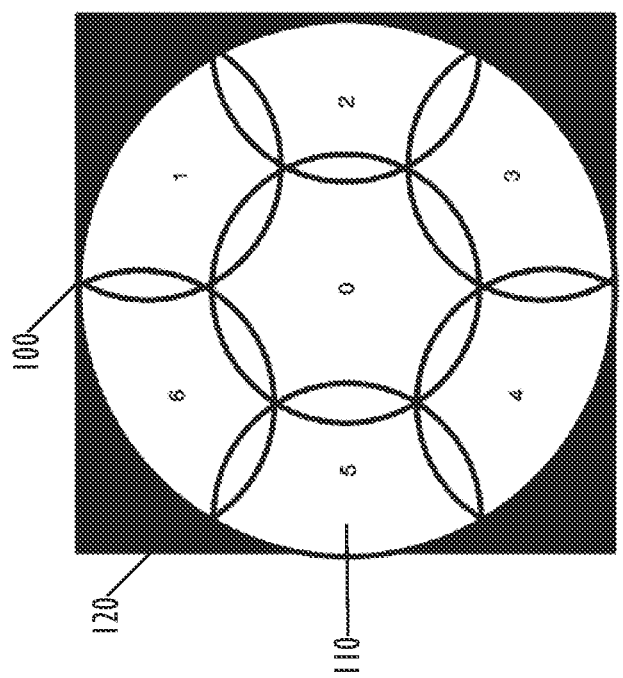

This disclosure pertains to systems, methods, and computer readable media for a multi-view video codec with foveated imaging. A camera captures an image stream and provides it to a server device. The server generates a plurality of copies of the image stream, and then encodes each copy with a different area at a higher resolution than the other areas. The higher resolution area for each stream is considered an area of interest. Any warping technique may be used to achieve a higher resolution at the area of interest than the other areas, and each copy and area of interest may be encoded with a different warping based on how many pixels per degree of the field of view in that particular area. The server may then send the plurality of copies of the image stream to a playback device. Alternatively, the playback device may send an indication of an area of interest and the server may send a particular copy of the image stream corresponding to that area of interest. As the area of interest changes, the server may send a different copy of the image stream corresponding to the new area of interest. Selective blurring may be used to compensate for some pixelation due to the foveated imaging and to help smooth the transition between different image streams.

For example, a high-resolution fish-eye camera with a 180 degree field of view captures an image stream and provides it to a server. The server makes seven copies of the high-resolution fish-eye image stream, and encodes each of the seven copies for a different area of interest. That is, each copy includes the full 180 degree field of view, but the area in high resolution is different across the seven copies. The server then provides the seven encoded copies of the image stream to a playback device. Alternatively, the server may provide a particular image stream corresponding to a user's area of interest such as a user's gaze position.

Various examples of electronic systems and techniques for using such systems in relation to foveated imaging are described.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of foveated imaging systems having the benefit of this disclosure.

FIG. 1 shows example diagrams of different high-resolution regions within a scene captured by a fish-eye lens camera. Diagram 100 shows an image captured by a fish-eye lens camera. The white circle 110 indicates the image data representing the scene, and the black square 120 overlaid by the white circle 110 indicates the unused pixels of the image sensor. The image data 110 is divided into seven circular regions numbered 0-6 which overlap with neighboring regions and can be used to indicate different regions of the scene for image foveation. For example, seven copies of the image data 110 can be made, and each copy can be encoded to have a unique high-resolution region corresponding to one of the seven circular regions numbered 0-6. Although diagram 100 shows an image stream captured by a fish-eye lens camera, any kind of camera may be used to capture the image stream.

Diagram 150 depicts an example of image data representing a scene. In particular, diagram 150 depicts seven copies of the image data 110 indicated by the seven boxes, in which each copy differs based on a high resolution area specific to a particular region. As shown in diagram 150, each of the seven regions numbered 0-6 includes a high-resolution, inner circle at a particular portion of the scene and a lower-resolution, outer ring encompassing the remainder of the scene. That is, each of the seven copies includes the entire diagram 100, but has a different region of high-resolution. According to some embodiments, the different regions may or may not partially overlap, but do not completely overlap. The copy of the image stream with a high-resolution region corresponding to the location of an area of interest in the scene may be displayed. As the area of interest in the scene moves from a first location to a second location, the copy of the image stream with a high-resolution region including the first location within the scene may be exchanged for the copy of the image stream with a high-resolution region including the second location within the scene. In diagram 100, each of the seven circular regions overlap at least partially with other regions, which may smooth transitions from one copy of the image stream to another. Although diagram 100 shows circular image data 110, the image data 110 may be rectangular or another shape based on the camera capturing the image data 110. Similarly, although diagram 100 shows the circular image data 110 divided into seven circular regions, any number or shape of region can be used to divide the image data 110 into different regions that may have no or some overlap with other regions.

Figure 2:
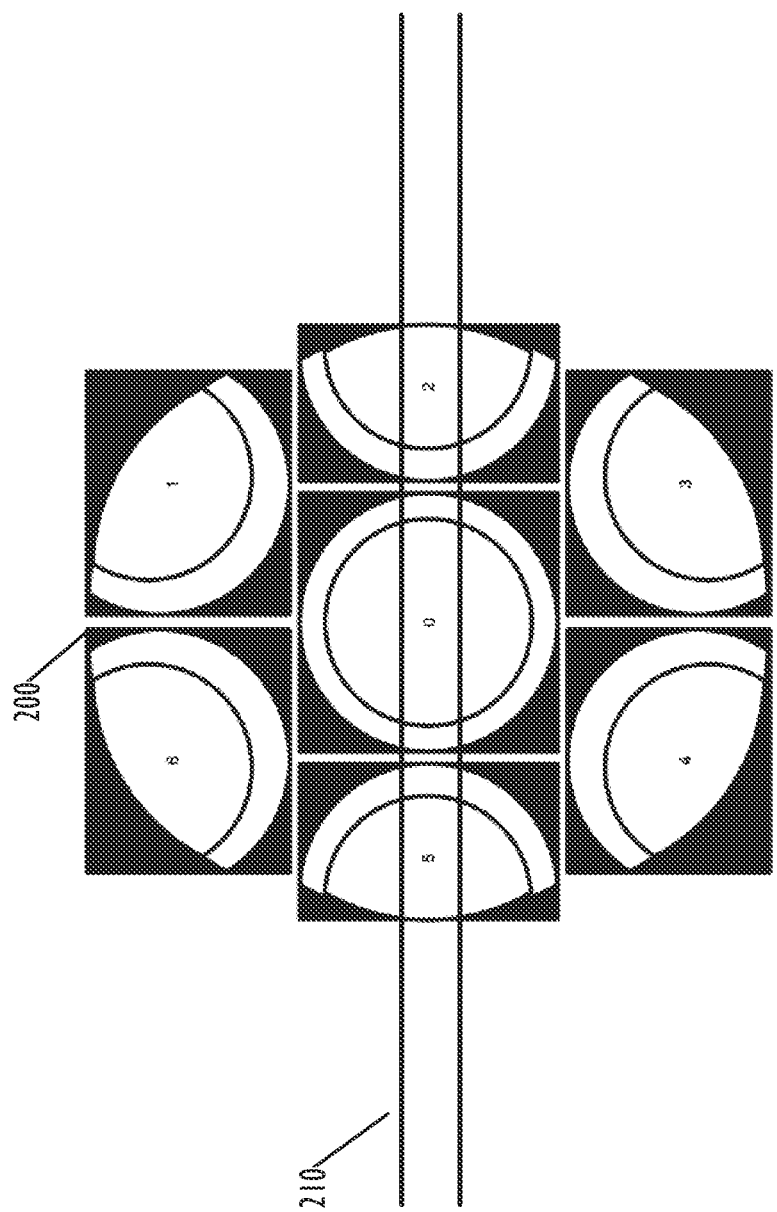
FIG. 2 shows an example diagram of a changing area of interest within a foveated image stream.

FIG. 2 shows an example diagram 200 of a foveated image stream of a scene with a changing area of interest. For example, the image stream 200 shows a basketball game scene. The section 210 is the portion of the scene that shows the basketball court and players, while the outer regions show the stadium seats and the like. The copy of the image stream with region 5 in high resolution includes the left-side basket of the basketball court in high resolution and the remainder of the scene in low resolution, and the copy of the image stream with region 2 in high resolution includes the right-side basket of the basketball court in high resolution and the remainder of the scene in low resolution. As the area of play and the basketball move from one side of the court to the other, the area of interest to the user changes from one location within the image stream 200 to another, and the copy of the image stream with the corresponding high-resolution region can be displayed. In some embodiments, the area of interest may be determined based on a gaze location by a user. For example, a user's gaze may follow the game play across the court. As the basketball moves from the left side of the court to the right side of the court in the section 210, the user's gaze will follow the basketball from the left side of the image stream to the right side of the image stream. Additionally, or alternatively, the area of interest may be determined based on content of the scene, such as automatically identifying the region with dynamic content. For example, the basketball may be tracked in the image data. The copy of the image stream with region 5 in high resolution can be traded out for the copy of the image stream with region 0 in high resolution, and then the copy of the image stream with region 2 in high resolution. The overlapping areas between two neighboring high-resolution regions of the copies of the image stream can be used to smooth transitions from one copy to the next.

Figure 3:
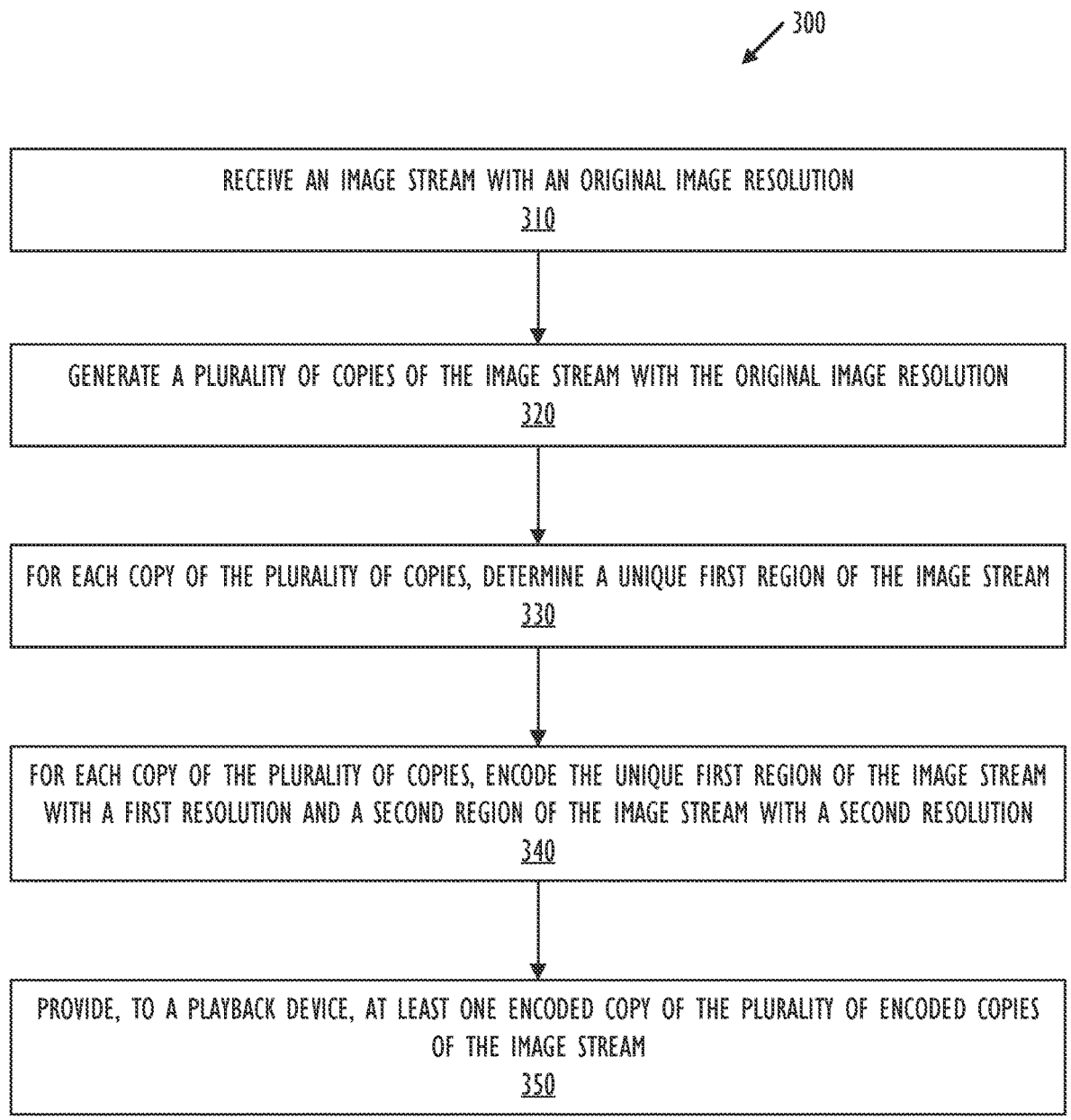
FIG. 3 shows, in flowchart form, an example process for generating adaptive foveated image streams.

FIG. 3 shows, in flowchart form, an example process 300 for generating adaptive foveated image streams. As described below, a server may provide multiple image streams having a unique distribution of different resolutions at different regions. The image streams may be provided to a playback device which may select a particular image stream for playback. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added.

The flowchart 300 begins at block 310, where the electronic device receives an image stream with an original image resolution. For example, the electronic device receives the image stream 100 shown in FIG. 1 from a camera. At block 320, the electronic device generates a plurality of copies of the image stream with the original image resolution. The number of copies in the plurality of copies may be determined based on the size and/or shape of the scene captured by the image stream, and the like. For example, the electronic device generates seven copies of the image stream 100. At block 330, the electronic device determines a unique and/or different first region of the image stream for each copy of the plurality of copies of the image stream. For example, the different first regions for the seven copies of the image stream 100 correspond to the regions numbered 0-6. A size of the unique first regions can be determined based on the original image resolution, the number of copies in the plurality of copies, the intended display resolution, and the like.

The flowchart 300 continues at block 340, where the electronic device encodes the unique first regions with a first resolution and second regions of the image stream with a second resolution. For example, the unique first region corresponding to region 5 in diagram 150 is encoded at a first resolution, and the second region corresponding to the outer ring around region 5 is encoded at a second resolution. The first resolution is higher than the second resolution, in some embodiments, and may be the original image resolution. Any appropriate warping and/or encoding technique may be used to encode the first regions at the first resolution and the second regions at the second resolution. At block 350, the electronic device provides at least one encoded copy of the plurality of encoded copies of the image stream to a playback device. For example, the electronic device can determine the location of an area of interest within the scene at a first time and provide the encoded copy having a first region corresponding to the location to the playback device. As the location of the area of interest within the scene changes at a second time, the electronic device can determine an updated location of the area of interest and provide the encoded copy having a first region corresponding to the updated location to the playback device.

Figure 4:
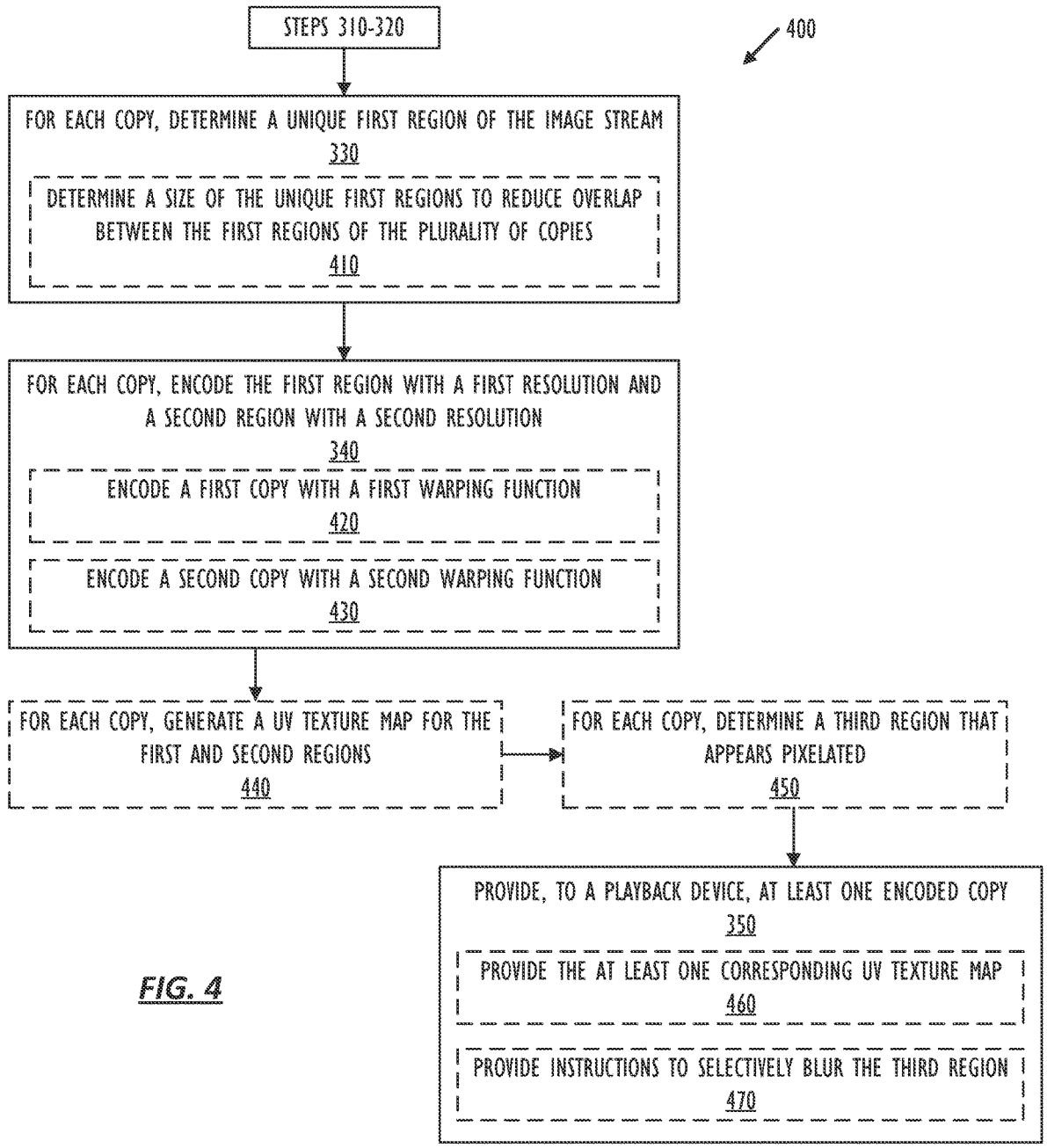
FIG. 4 shows, in flowchart form, an example process for generating adaptive foveated image streams with UV texture mapping.

FIG. 4 shows, in flowchart form, an example process 400 for generating adaptive foveated image streams with UV texture mapping. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added. For ease of explanation, the process 400 is described with reference to the process 300 described herein with reference to FIG. 3.

The flowchart 400 begins with steps 310 and 320, as described above with reference to FIG. 3. Determining a unique, that is, different first region of the image stream for each copy in step 330 may optionally include step 410, at which the electronic device determines a size of the unique first regions to reduce overlap between the first regions of the plurality of copies of the image stream. The overlap between the first regions of the plurality of copies may be reduced to reduce the relative portion of the image stream encoded at a first, higher resolution compared to the portion of the image stream encoded at a second, lower resolution. For example, the size of the first regions may be large enough that the high-resolution first region of one copy of the image stream has approximately one third of its area overlapping with the high-resolution first regions of one or more other copies of the image stream. The one third overlap between the high-resolution first regions of the copies of the image stream may smooth transitions from one copy of the image stream to another and reduce the amount of bandwidth used to provide the encoded copy to the playback device. Encoding each copy of the image stream such that the first and second regions have the first and second resolutions, respectively, at step 340 can optionally include block 420, at which the electronic device encodes a first copy of the image stream with a first warping function, and block 430, at which the electronic device encodes a second copy of the image stream with a second warping function. Any appropriate warping function and number of warping functions may be used to encode the plurality of copies of the image stream.

At block 440, the electronic device may optionally generate, for each copy in the plurality of copies of the image stream, a UV texture map for the first and second regions. The UV texture map may describe the warping function encoding the first and second regions at the first and second resolutions, respectively. At block 450, the electronic device may optionally determine, for each copy in the plurality of copies of the image stream, a third region that appears pixelated. Providing the at least one encoded copy of the image stream to a playback device at block 350 may optionally include blocks 460 and 470. At block 460, the electronic device may optionally provide the at least one corresponding UV texture map to the playback device. The playback device may use the at least one corresponding UV texture map to decode the encoded copy of the image stream into the first and second regions having the first and second resolutions, respectively. At block 470, the electronic device may optionally provide instructions to selectively blur the third region of the image stream, for example to reduce the pixelated appearance of the third region.

Figure 5:
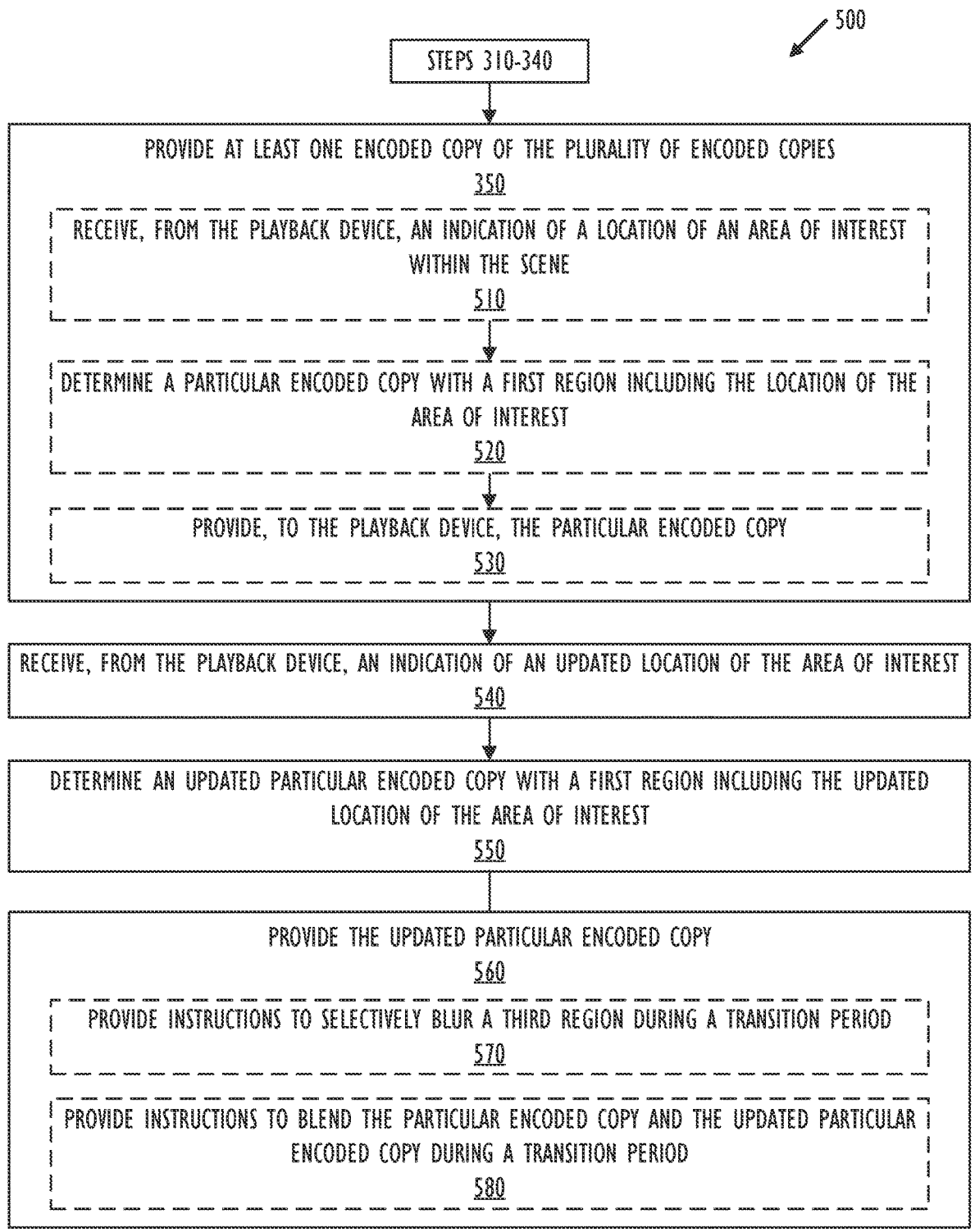
FIG. 5 shows, in flowchart form, an example process for providing a particular foveated image stream based on an indication of an area of interest.

In some embodiments, a server may determine a particular encoded copy to provide to the client device based on a provided location of an area of interest in the scene. FIG. 5 shows, in flowchart form, an example process 500 for providing a particular foveated image stream based on an indication of an area of interest. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added. For ease of explanation, the process 500 is described with reference to the process 300 as described above with reference to FIG. 3.

The flowchart 500 begins with steps 310-340, as described above with reference to FIG. 3. Providing at least one encoded copy of the plurality of encoded copies of the image stream to a playback device at step 350 may optionally include steps 510, 520, and 530. At block 510, the electronic device may receive an indication of an area of interest from the playback device. Returning to the basketball game example described above with reference to FIG. 2, the playback device may provide an indication of a user's gaze position at the center line of the basketball court within the section 210 of the basketball game scene shown in the image stream 200. At block 520, the electronic device may determine a particular encoded copy of the image stream with a first region corresponding to the area of interest. For example, the electronic device determines a particular encoded copy having a first region that includes the center line of the basketball court. At step 530, the electronic device may provide the particular encoded copy of the image stream to the playback device.

At block 540, the electronic device may receive an indication of an updated area of interest from the playback device. Returning to the example of the user's gaze position and the basketball game shown in the image stream 200, the playback device may provide an indication that the user's gaze position has changed from a first gaze position at the center line of the basketball court to a second gaze position at a basket to one end of the basketball court. At block 550, the electronic device may determine an updated particular encoded copy of the image stream with a first region corresponding to the updated area of interest. For example, the electronic device determines an updated particular encoded copy of the image stream with a first region that includes the basket to one end of the basketball court. At step 560, the electronic device may provide the updated particular encoded copy of the image stream to the playback device. Providing the updated particular encoded copy at block 560 may optionally include blocks 570 and 580. At block 570, the electronic device may optionally provide instructions to selectively blur a third region of the image stream during a transition period between display of the particular encoded copy and display of the updated particular encoded copy. For example, the electronic device may provide instructions to blur a third region of the image stream between the user's first gaze position and the user's second gaze position.

At block 580, the electronic device may optionally provide instructions to blend the particular encoded copy and the updated particular encoded copy during a transition period between the area of interest and the updated area of interest. For example, the electronic device may provide instructions to blend the particular encoded copy at a greater weight with the updated particular encoded copy at a smaller weight at an early time during the transition period and blend the particular encoded copy at a smaller weight with the updated particular encoded copy at a greater weight at a later time during the transition period.

Figure 6:
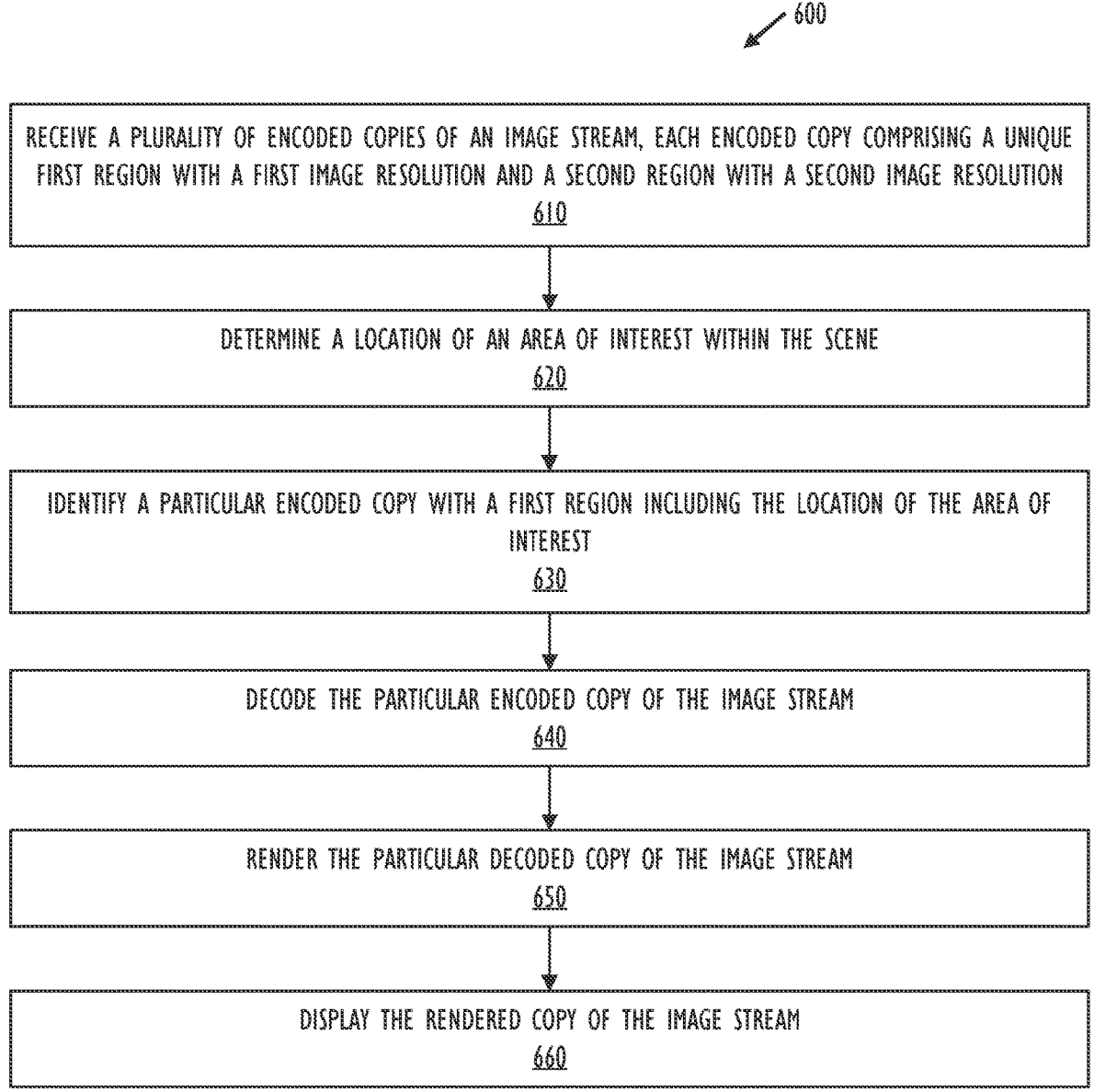
FIG. 6 shows, in flowchart form, an example process for displaying a foveated image stream based on an area of interest.

FIG. 6 shows, in flowchart form, an example process 600 for displaying a foveated image stream based on an area of interest. As described below, a playback device may receive multiple image streams having a different distribution of different resolutions at different regions and select a particular image stream for playback. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added.

The flowchart begins at block 610, where the electronic device, for example a playback device, receives a plurality of encoded copies of an image stream. Each encoded copy of the image stream comprises a different first region with a first image resolution and a second region with a second image resolution. For example, in one encoded copy of the image stream, the different first region corresponds to region 5 in diagram 150, and the second region corresponds to the outer ring around region 5. The first resolution is higher than the second resolution, in some embodiments. As described above with reference to FIG. 1, each encoded copy of the image stream comprises a different portion of the scene at a higher resolution than the remainder of the scene. At block 620, the electronic device determines the location of an area of interest within the scene. For example, the electronic device can determine the location of the area of interest based on a user's gaze position or the position of a mouse cursor.

At block 630, the electronic device identifies a particular encoded copy of the image stream with a first region corresponding to the area of interest. That is, the electronic device identifies which particular encoded copy of the image stream has a unique first region that includes the area of interest. The electronic device decodes the particular encoded copy of the image stream at step 640, and renders the particular decoded copy of the image stream at step 650. At block 660, the electronic device displays the rendered copy of the image stream.

Figure 7:
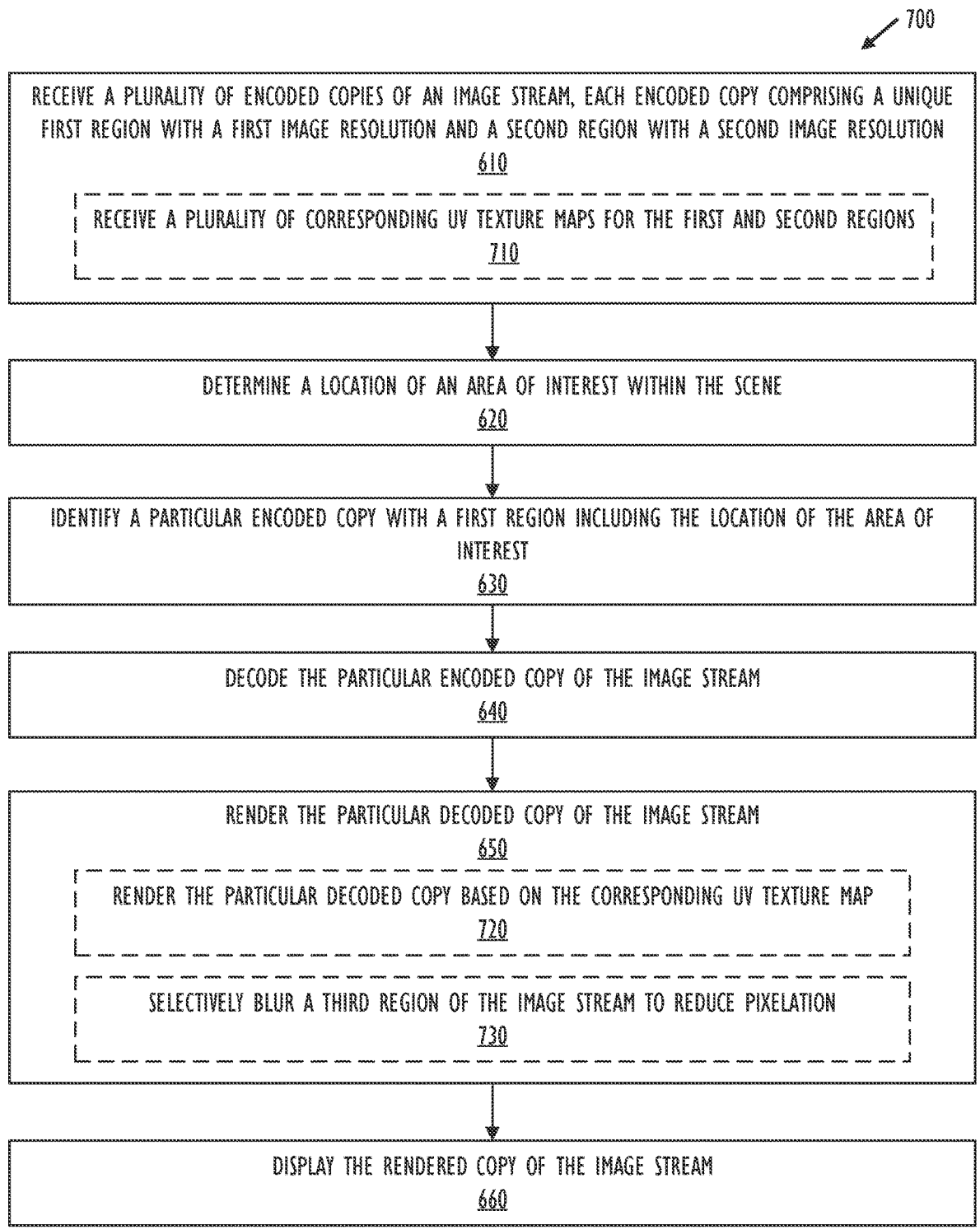
FIG. 7 shows, in flowchart form, an example process for displaying a foveated image stream based on an area of interest and UV texture maps.

FIG. 7 shows, in flowchart form, an example process 700 for displaying a foveated image stream based on an area of interest and UV texture maps. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added. For ease of explanation, the process 700 is described with reference to the process 600 as described above with reference to FIG. 6.

Receiving a plurality of encoded copies of an image stream at block 610 may optionally include block 710, where the electronic device receives a plurality of corresponding UV texture maps for the first and second regions of the image stream. Each UV texture map may describe the warping function that encodes the first and second regions at the first and second resolutions, respectively, for the corresponding encoded copy of the image stream. Steps 620-640 are described above with reference to FIG. 6. Rendering the particular decoded copy of the image stream at step 650 may optionally include steps 720 and 730. At block 720, the electronic device may optionally render the particular decoded copy of the image stream based on the corresponding UV texture map. At block 730, the electronic device may optionally selectively blur a third region of the image stream, for example to reduce the pixelated appearance of the third region. At step 660, the electronic device displays the rendered copy of the image stream.

Figure 8:
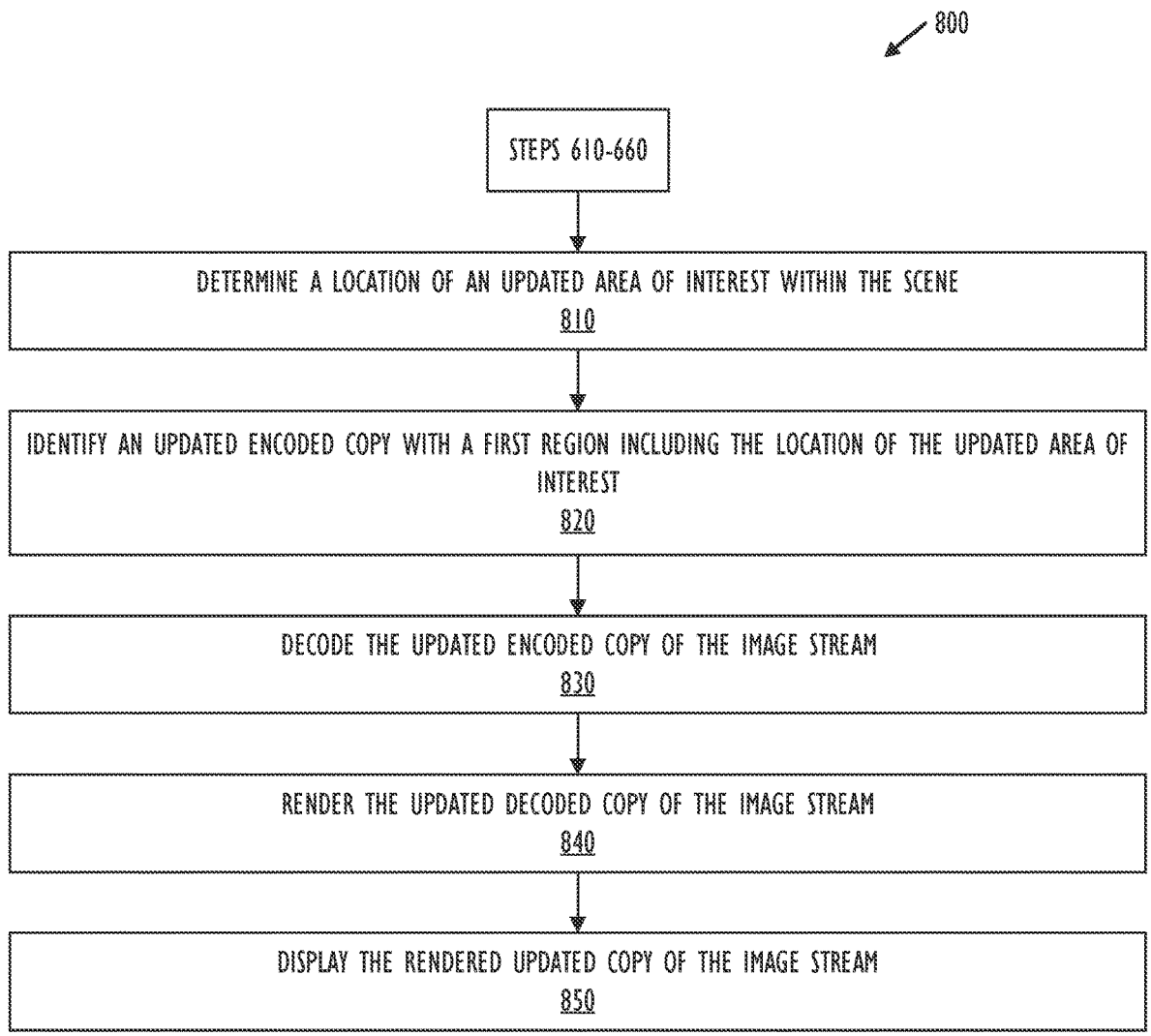
FIG. 8 shows, in flowchart form, an example process for displaying a foveated image stream based on an area of interest and updating which foveated image stream is displayed based on a change in the area of interest.

FIG. 8 shows, in flowchart form, an example process 800 for displaying a foveated image stream based on an area of interest and updating which foveated image stream is displayed based on a change in the area of interest. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added. For ease of explanation, the process 800 is described with reference to the process 600 as described above with reference to FIG. 6.

Steps 610-660 are described above with reference to FIG. 6. Displaying the rendered copy of the image stream at step 660 proceeds to step 810, where the electronic device determines the location of an updated area of interest within the scene shown in the image stream. For example, the electronic device determines the location of an updated area of interest based on a change in the user's gaze position or a change in the user's cursor position. At block 820, the electronic device identifies an updated encoded copy of the image stream with a first region corresponding to the location of the updated area of interest within the scene. That is, the electronic device identifies which particular encoded copy of the image stream has a unique first region that includes the updated area of interest in the scene. The electronic device decodes the updated encoded copy of the image stream at block 830, renders the updated decoded copy of the image stream at block 840, and displays the rendered updated copy of the image stream at block 850.

Figure 9:
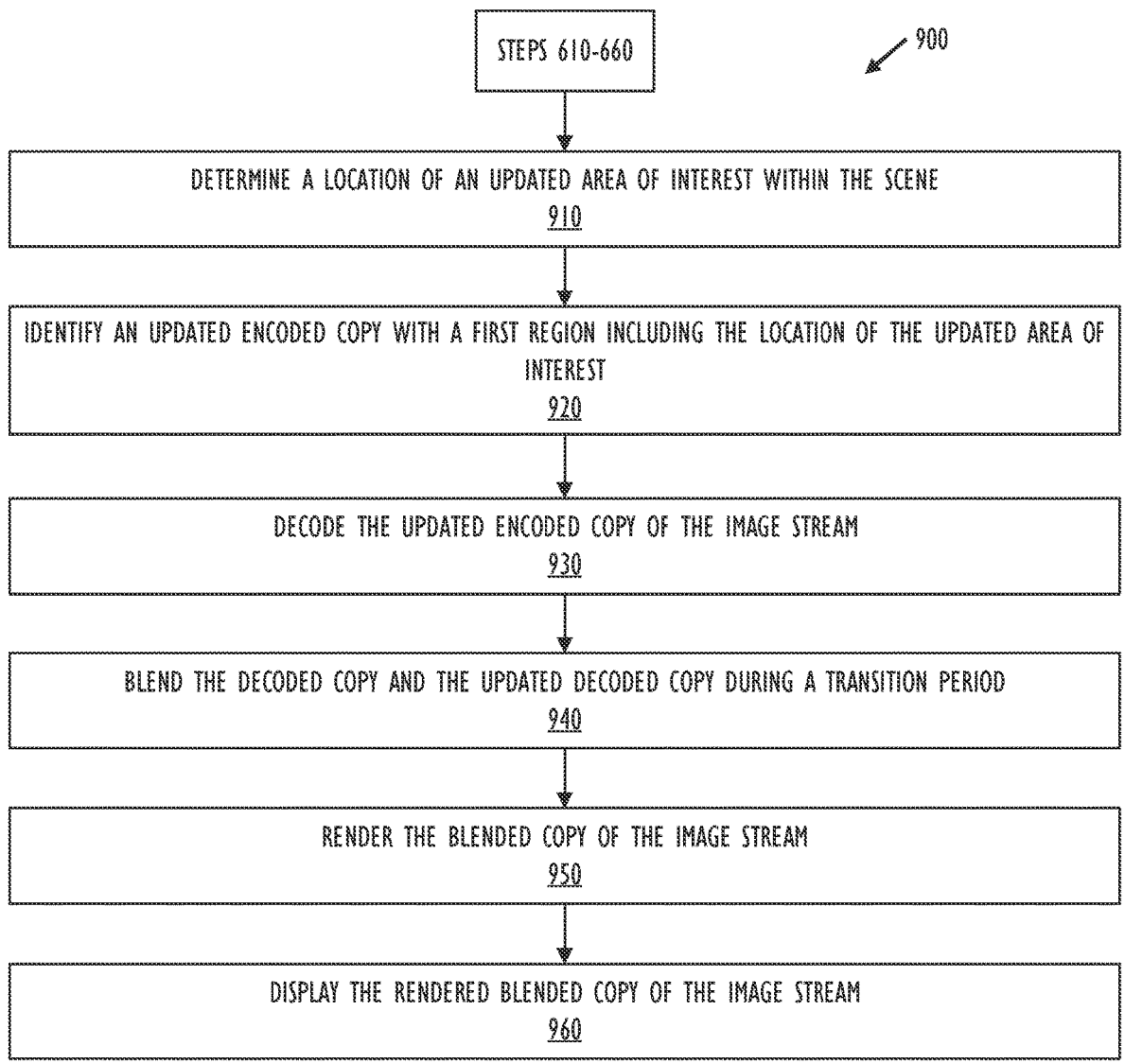
FIG. 9 shows, in flowchart form, an example process for displaying a foveated image stream based on an area of interest and blending two foveated image streams based on a change in the area of interest.

FIG. 9 shows, in flowchart form, an example process 900 for displaying a foveated image stream based on an area of interest and blending two foveated image streams based on a change in the area of interest. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added. For ease of explanation, the process 900 is described with reference to the process 600 as described above with reference to FIG. 6.

Steps 610-660 are described above with reference to FIG. 6. After displaying the rendered copy of the image stream at step 660, the process 900 proceeds to step 910, where the electronic device determines the location of an updated area of interest within the scene shown in the image stream. As described previously herein with respect to step 810 in FIG. 8, the electronic device may determine the location of an updated area of interest based on a change in the user's gaze position or a change in the user's cursor position. At block 920, the electronic device identifies an updated encoded copy of the image stream with a first region corresponding to the location of the updated area of interest. That is, the electronic device identifies which particular encoded copy of the image stream has a unique first region that includes the updated area of interest within the scene. The electronic device decodes the updated encoded copy of the image stream at block 930.

At step 940, the electronic device blends the decoded copy and the updated decoded copy of the image stream during a transition period between display of the decoded copy showing the area of interest in high resolution and display of the updated decoded copy showing the updated area of interest in high resolution. For example, the electronic device may blend the decoded copy at a greater weight with the updated decoded copy at a smaller weight at an early time during the transition period and blend the decoded copy at a smaller weight with the updated decoded copy at a greater weight at a later time during the transition period. At block 950, the electronic device renders the blended copy of the image stream, and displays the rendered blended copy of the image stream at step 960.

Figure 10:
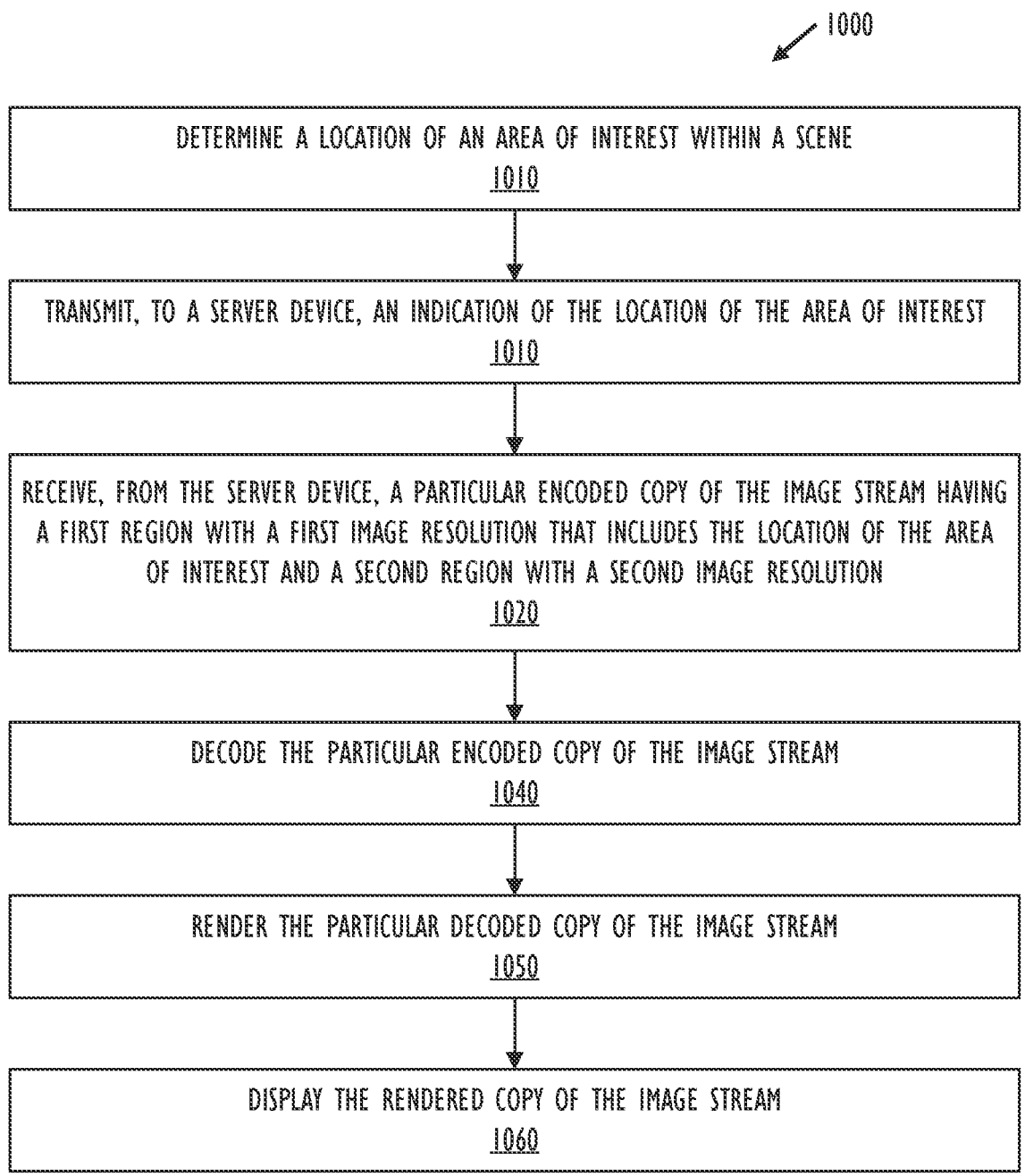
FIG. 10 shows, in flowchart form, an example process for requesting and displaying a foveated image stream.

FIG. 10 shows, in flowchart form, an example process 1000 for requesting and displaying a foveated image stream based on an area of interest. For purposes of explanation, the following steps are described as being performed by particular components, However, it should be understood that the various actions may be performed by alternate components. In addition, the various actions may be performed in a different order. Further, some actions may be performed simultaneously, and some may not be required, or others may be added.

The flowchart begins at block 1010, where the electronic device, for example a playback device, determines the location of an area of interest within a scene shown in an image stream. For example, the electronic device can determine the location of the area of interest based on a user's gaze position or the position of a mouse cursor within the scene. At block 1020, the electronic device transmits an indication of the location of the area of interest to a server device. At block 1030, the electronic device receives a particular encoded copy of the image stream from the server device. The particular encoded copy has a first region with a first image resolution that corresponds to the location of the area of the interest within the scene and a second region with a second image resolution. The first resolution is higher than the second resolution, in some embodiments. At block 1040, the electronic device decodes the particular encoded copy of the image stream and renders the particular decoded copy of the image stream at step 1050. At block 1060, the electronic device displays the rendered copy of the image stream.

Figure 11:
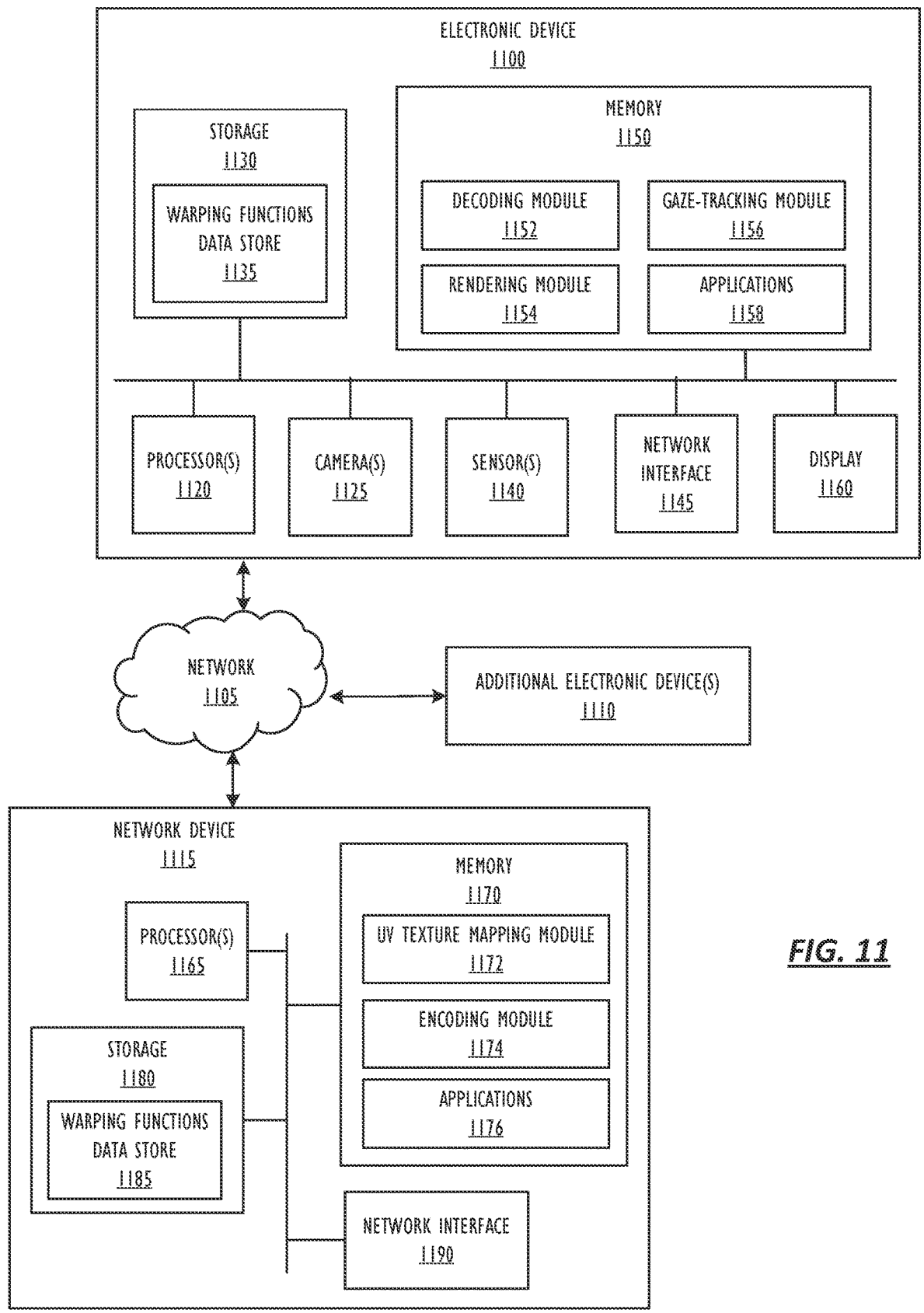
FIG. 11 shows, in block diagram form, exemplary systems for adaptive foveated imaging.

Referring to FIG. 11, a simplified block diagram of an electronic device 1100 is depicted, communicably connected to additional electronic devices 1110 and a network device 1115 over a network 1105, in accordance with one or more embodiments of the disclosure. Electronic device 1100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 1100, additional electronic device 1110, and/or network device 1115 may additionally, or alternatively, include one or more additional devices within which the various functionality may be contained, or across which the various functionality may be distributed, such as server devices, base stations, accessory devices, and the like. Illustrative networks, such as network 1105 include, but are not limited to, a local network such as a universal serial bus (USB) network, an organization's local area network, and a wide area network such as the Internet. According to one or more embodiments, electronic device 1100 is utilized to enable a multi-view video codec. It should be understood that the various components and functionality within electronic device 1100, additional electronic device 1110 and network device 1115 may be differently distributed across the devices, or may be distributed across additional devices.

Electronic device 1100 may include one or more processors 1120, such as a central processing unit (CPU). Processor(s) 1120 may include a system-on-chip such as those found in mobile devices and include one or more dedicated graphics processing units (GPUs). Further, processor(s) 1120 may include multiple processors of the same or different type. Electronic device 1100 may also include a memory 1150. Memory 1150 may include one or more different types of memory, which may be used for performing device functions in conjunction with processor(s) 1120. For example, memory 1150 may include cache, ROM, RAM, or any kind of transitory or non-transitory computer readable storage medium capable of storing computer readable code. Memory 1150 may store various programming modules for execution by processor(s) 1120, including decoding module 1152, rendering module 1154, gaze-tracking module 1156, and other various applications 1158. Electronic device 1100 may also include storage 1130. Storage 1130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 1130 may be configured to store warping functions data 1135, according to one or more embodiments. Electronic device may additionally include a network interface 1145 from which the electronic device 1100 can communicate across network 1105.

Electronic device 1100 may also include one or more cameras 1125 or other sensors 1140, such as a depth sensor, from which depth of a scene may be determined. In one or more embodiments, each of the one or more cameras 1125 may be a traditional RGB camera, or a depth camera. Further, cameras 1125 may include a stereo- or other multi-camera system, a time-of-flight camera system, or the like.

Electronic device 1100 may also include a display 1060. The display device 1160 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 1130 may be utilized to store various data and structures which may be utilized for providing warping functions data to decode a copy of an image stream such that a first region has a first resolution and a second region has a second resolution. According to one or more embodiments, memory 1150 may include one or more modules that comprise computer readable code executable by the processor(s) 1120 to perform functions. The memory may include, for example a decoding module 1152 which may be used to decode an image stream, a rendering module 1154 which may be used to render the decoded image stream, a gaze-tracking module 1156 which may be used to determine a user's gaze position and an area of interest in the image stream, as well as other applications 1158.

Although electronic device 1100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 12:
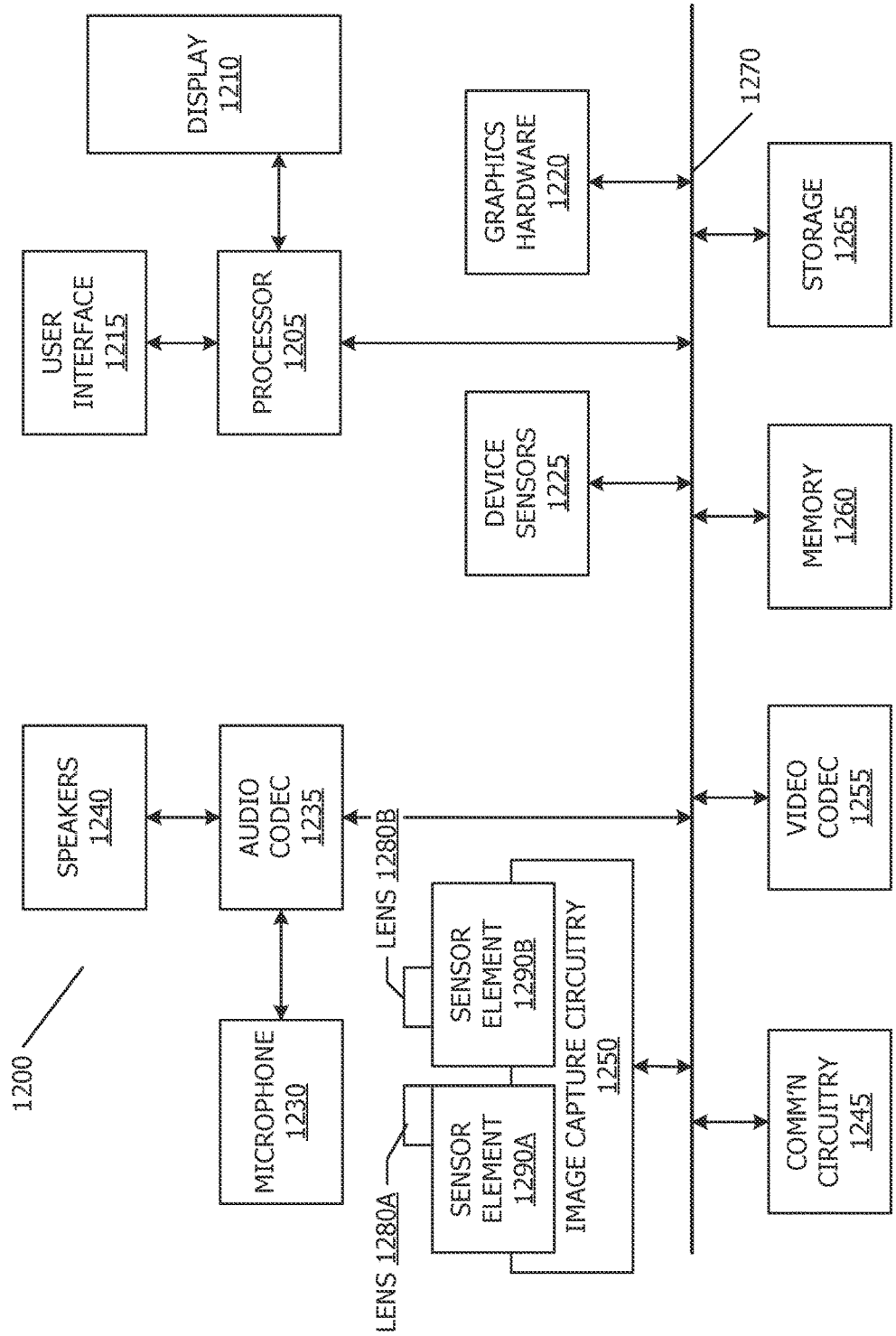
FIG. 12 shows an exemplary system for use in various multi-view video codecs, including for foveated imaging.

Referring now to FIG. 12, a simplified functional block diagram of illustrative multifunction electronic device 1200 is shown according to one embodiment. Each of electronic devices may be a multifunctional electronic device, or may have some or all of the described components of a multifunctional electronic device described herein. Multifunction electronic device 1200 may include processor 1205, display 1210, user interface 1215, graphics hardware 1220, device sensors 1225 (e.g., proximity sensor/ambient light sensor, accelerometer and/or gyroscope), microphone 1230, audio codec(s) 1235, speaker(s) 1240, communications circuitry 1245, digital image capture circuitry 1250 (e.g., including camera system), video codec(s) 1255 (e.g., in support of digital image capture unit), memory 1260, storage device 1265, and communications bus 1270. Multifunction electronic device 1200 may be, for example, a digital camera or a personal electronic device such as a personal digital assistant (PDA), personal music player, mobile telephone, or a tablet computer.

Processor 1205 may execute instructions necessary to carry out or control the operation of many functions performed by device 1200 (e.g., such as the generation and/or processing of images as disclosed herein). Processor 1205 may, for instance, drive display 1210 and receive user input from user interface 1215. User interface 1215 may allow a user to interact with device 1200. For example, user interface 1215 can take a variety of forms, such as a button, keypad, dial, a click wheel, keyboard, display screen, touch screen, gaze, and/or gestures. Processor 1205 may also, for example, be a system-on-chip such as those found in mobile devices and include a dedicated GPU. Processor 1205 may be based on reduced instruction-set computer (RISC) or complex instruction-set computer (CISC) architectures or any other suitable architecture and may include one or more processing cores. Graphics hardware 1220 may be special purpose computational hardware for processing graphics and/or assisting processor 1205 to process graphics information. In one embodiment, graphics hardware 1220 may include a programmable GPU.

Image capture circuitry 1250 may include two (or more) lens assemblies 1280A and 1280B, where each lens assembly may have a separate focal length. For example, lens assembly 1280A may have a short focal length relative to the focal length of lens assembly 1280B. Each lens assembly may have a separate associated sensor element 1290. Alternatively, two or more lens assemblies may share a common sensor element. Image capture circuitry 1250 may capture still and/or video images. Output from image capture circuitry 1250 may be processed, at least in part, by video codec(s) 1255 and/or processor 1205 and/or graphics hardware 1220, and/or a dedicated image processing unit or pipeline incorporated within circuitry 1265. Images so captured may be stored in memory 1260 and/or storage 1265.

Sensor and camera circuitry 1250 may capture still and video images that may be processed in accordance with this disclosure, at least in part, by video codec(s) 1255 and/or processor 1205 and/or graphics hardware 1220, and/or a dedicated image processing unit incorporated within circuitry 1250. Images so captured may be stored in memory 1260 and/or storage 1265. Memory 1260 may include one or more different types of media used by processor 1205 and graphics hardware 1220 to perform device functions. For example, memory 1260 may include memory cache, read-only memory (ROM), and/or random access memory (RAM). Storage 1265 may store media (e.g., audio, image and video files), computer program instructions or software, preference information, device profile information, and any other suitable data. Storage 1265 may include one more non-transitory computer-readable storage mediums including, for example, magnetic disks (fixed, floppy, and removable) and tape, optical media such as CD-ROMs and DVDs, and semiconductor memory devices such as EPROM and EEPROM. Memory 1260 and storage 1265 may be used to tangibly retain computer program instructions or code organized into one or more modules and written in any desired computer programming language. When executed by, for example, processor 1205 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 4-10 or the arrangement of elements shown in FIGS. 11 and 12 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for encoding an image stream, comprising:
receiving an image stream with an original image resolution;
generating a plurality of encoded copies of the image stream;
wherein each frame of the image stream is comprised of a plurality of regions, and wherein each encoded copy of the image stream encodes a different one or more region of the plurality of regions at a first image resolution; and
providing, to a playback device, at least one encoded copy of the plurality of encoded copies of the image stream.

2. The method of claim 1, wherein providing the at least one encoded copy comprises:
receiving, from the playback device, an indication of an area of interest;
determining a first encoded copy having a region of the image stream encoded at the first resolution corresponding to the area of interest; and
providing, to the playback device, the first encoded copy of the image stream.

3. The method of claim 2, further comprising:
receiving, from the playback device, an indication of an updated area of interest;
determining a second encoded copy having a region of the image stream corresponding to the updated area of interest; and
providing, to the playback device, the second encoded copy of the image stream.

4. The method of claim 3, wherein providing the updated first encoded copy comprises providing, to the playback device, instructions to blend the first encoded copy and the updated first encoded copy during a transition period.

5. The method of claim 3, wherein providing the updated first encoded copy comprises providing, to the playback device, instructions to selectively blur an intermediate region of the image stream during a transition period.

6. The method of claim 1, further comprising generating, for each copy of the plurality of copies of the image stream, a UV texture map for the region of the image stream encoded at the first resolution, wherein providing the at least one encoded copy of the image stream comprises providing the corresponding UV texture map.

7. The method of claim 1, further comprising providing, to the playback device, instructions to selectively blur a second region of the image stream to reduce pixelation.

8. The method of claim 1, wherein encoding the image stream further comprising encoding at least one copy of the plurality of copies of the image stream with a first warping function and encoding at least one second copy of the plurality of copies of the image stream with a second warping function.

9. The method of claim 1, wherein encoding, for each copy of the plurality of copies of the image stream, the image stream comprises determining a size of the region encoded at the first resolution to reduce overlap between the first regions of the plurality of copies of the image stream.

10. A non-transitory computer readable medium comprising computer instructions to:
receive an image stream with an original image resolution;
generate a plurality of encoded copies of the image stream;
wherein each frame of the image stream is comprised of a plurality of regions, and wherein each encoded copy of the image stream encodes a different one or more region of the plurality of regions at a first image resolution; and
provide, to a playback device, at least one encoded copy of the plurality of encoded copies of the image stream.

11. The non-transitory computer readable medium of claim 10, wherein the instructions to provide the at least one encoded copy further comprise computer instructions to:
receive, from the playback device, an indication of an area of interest;
determine a first encoded copy having a region of the image stream encoded at the first resolution corresponding to the area of interest; and
provide, to the playback device, the first encoded copy of the image stream.

12. The non-transitory computer readable medium of claim 11, further comprising computer instructions to:
receive, from the playback device, an indication of an updated area of interest;
determine a second encoded copy having a region of the image stream corresponding to the updated area of interest; and
provide, to the playback device, the second encoded copy of the image stream.

13. The non-transitory computer readable medium of claim 12, wherein the instructions to provide the updated first encoded copy further comprise computer instructions to provide, to the playback device, instructions to blend the first encoded copy and the updated first encoded copy during a transition period.

14. The non-transitory computer readable medium of claim 12, wherein the instructions to provide the updated first encoded copy further comprise computer instructions to provide, to the playback device, instructions to blend the first encoded copy and the updated first encoded copy during a transition period.

15. The non-transitory computer readable medium of claim 10, further comprising computer instructions to generate, for each copy of the plurality of copies of the image stream, a UV texture map for the region of the image stream encoded at the first resolution, wherein providing the at least one encoded copy of the image stream comprises providing the corresponding UV texture map.

16. The non-transitory computer readable medium of claim 10, further comprising computer instructions to provide, to the playback device, instructions to selectively blur a second region of the image stream to reduce pixelation.

17. The non-transitory computer readable medium of claim 10, wherein the instructions to encode the image stream further comprise computer instructions to encode at least one copy of the plurality of copies of the image stream with a first warping function and encode at least one second copy of the plurality of copies of the image stream with a second warping function.

18. The non-transitory computer readable medium of claim 10, wherein the instructions to encode, for each copy of the plurality of copies of the image stream, the image stream further comprise computer instructions to determine a size of the region encoded at the first resolution to reduce overlap between the first regions of the plurality of copies of the image stream.

19. A method of displaying an image, comprising:
receiving a plurality of encoded copies of an image stream, wherein each frame of the image stream is comprised of a plurality of regions, and wherein each encoded copy encodes a different one or more of the plurality of regions at a first image resolution;

determining an area of interest in the image stream;
identifying a first encoded copy of the plurality of encoded copies having a region encoded at the first image resolution that corresponds to the area of interest;
decoding the first encoded copy of the image stream;
rendering the decoded copy of the image stream; and
displaying the rendered copy of the image stream.

20. The method of claim 19, further comprising:
determining an updated area of interest in the image stream;
identifying a second encoded copy having a region of the image stream corresponding to the updated area of interest;
decoding the second encoded copy of the image stream;
rendering the decoded updated copy of the image stream; and
displaying the rendered updated copy of the image stream.

\* \* \* \* \*